United States Patent Office 2,697,570
Patented Dec. 21, 1954

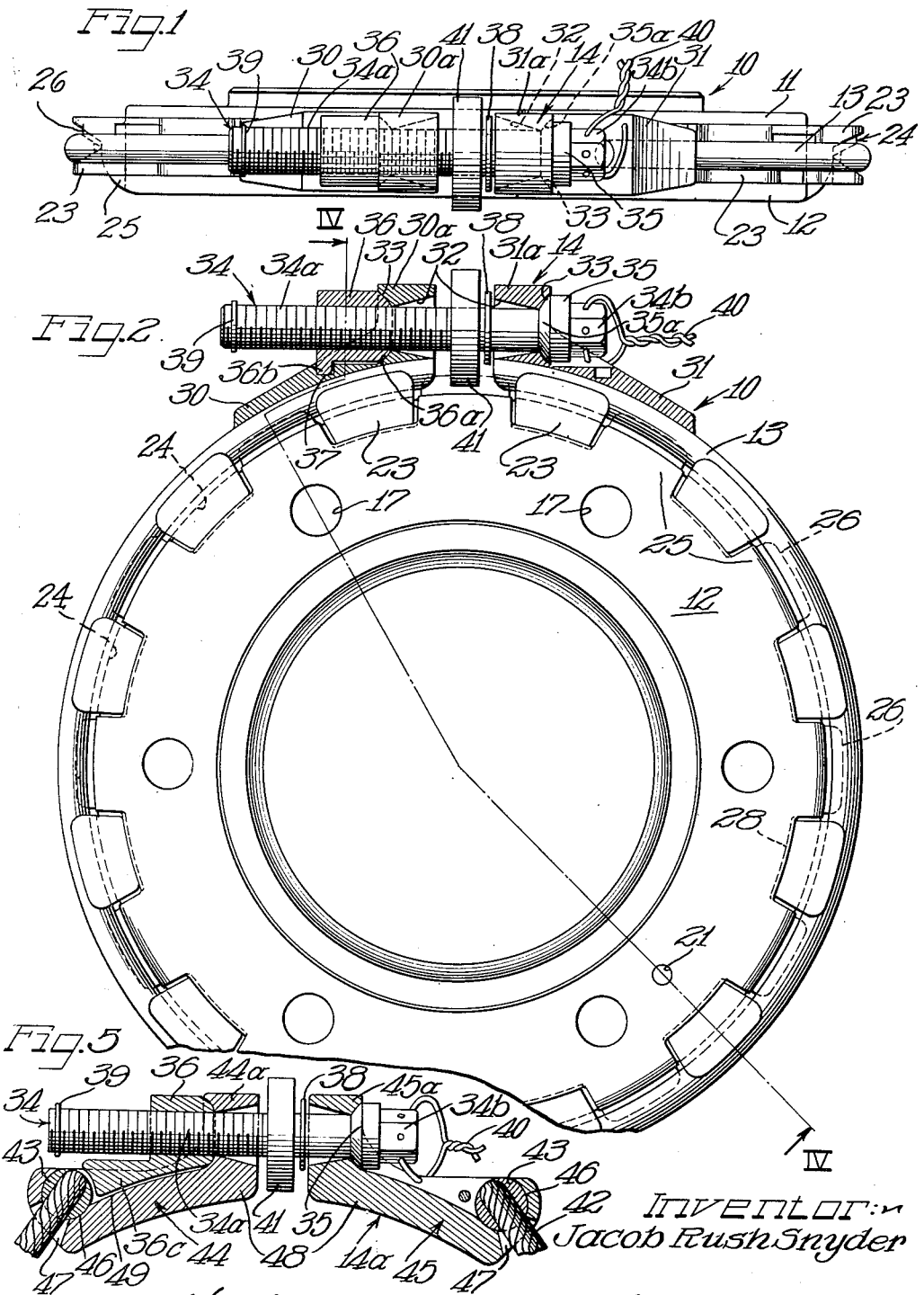

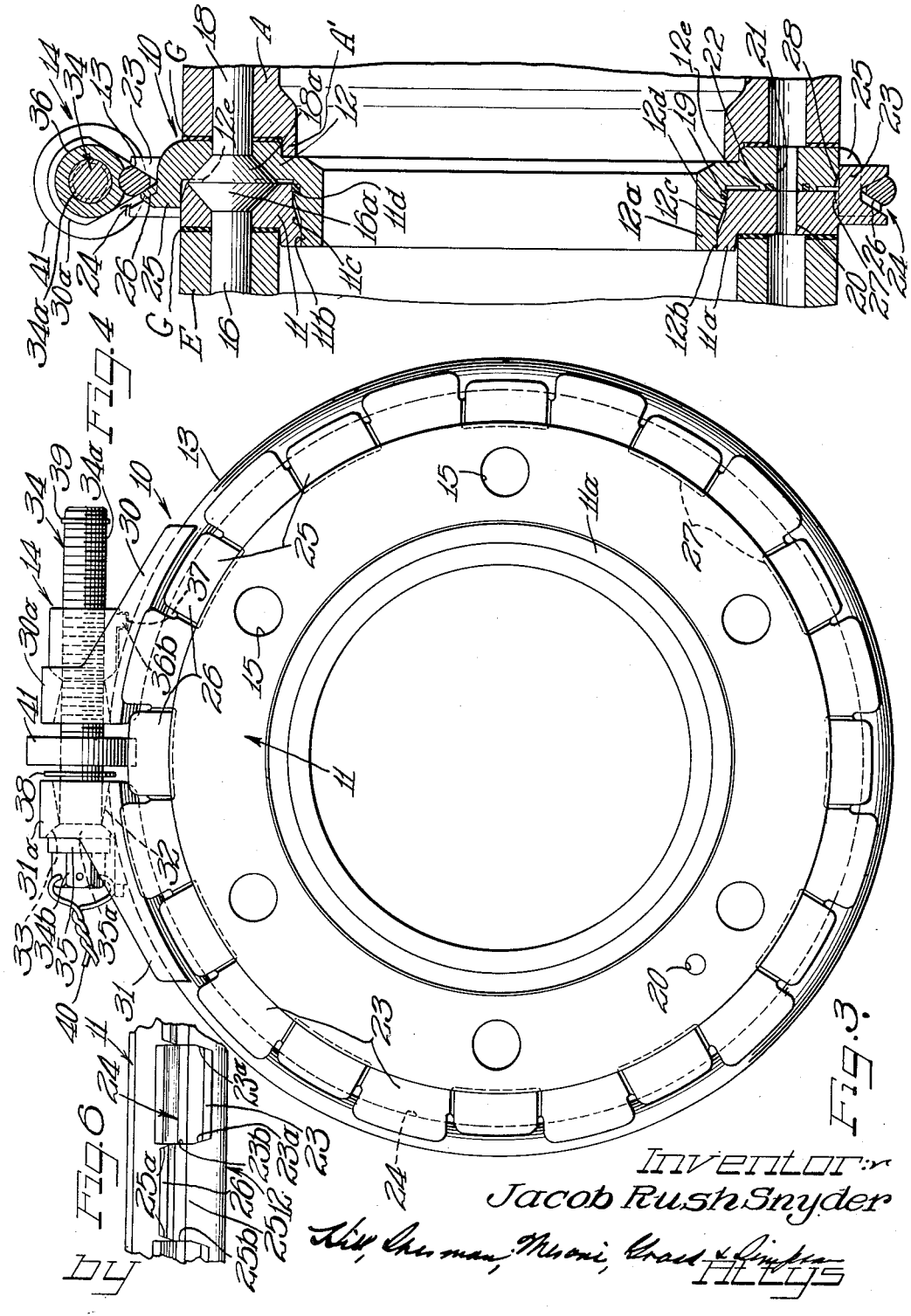

---

2,697,570

QUICK-ATTACHING DEVICE

Jacob Rush Snyder, Cleveland, Ohio, assignor to Thompson Products, Inc., Cleveland, Ohio, a corporation of Ohio Application May 1, 1951, Serial No. 223,901

11 Claims. (Cl. 248—2)

This invention relates to a coupling for quickly attaching parts in operative assembly through the media of a single connector.

Specifically, the invention relates to a quick attaching device for mounting various engine accessories on the engine.

The invention will hereinafter be specifically described as embodied in a quick attachment device for mounting accessories such as oil and fuel pumps, generators, starting motors, and the like directly on an engine, but it should be understood that the devices of this invention are adapted for general usage in coupling parts together.

According to this invention, a pair of rings are provided for respective attachment to the engine and to an accessory to be mounted on the engine. One ring has a pilot portion fitting in the other ring so that mating faces of the two rings may be quickly brought together in face to face sealed relation. One ring has circumferentially spaced peripherally grooved fingers radiating therefrom and the other ring has circumferentially spaced fingers fitting between the fingers of the first ring and equipped with outturned lugs providing abutment faces for alignment with the grooves of the fingers on the first ring. A clamping ring seated in the grooved fingers thrusts against the abutment faces of the lugs to wedge the two parts tightly together in fixed sealed relationship.

A feature of this invention resides in the provision of the grooved fingers on the one part so that the clamping ring will always be retained on this part.

Another feature resides in the provision of the retaining lugs on the second part with guide surfaces which easily slide under the clamping ring retained in the grooved fingers of the other part when the clamping ring is loosened.

Another feature of the invention resides in the provision of a draw bolt assembly for the clamping ring which has a deflectable member fitting between the grooved fingers so that the ring, when loosened, will not rotate around the part.

A still further feature of the invention resides in the provision of a draw bolt assembly for the clamping ring which will not only contract the ring but which will also positively expand the ring.

A still further feature of the invention resides in the provision of a multiple diameter pilot on the one part to facilitate alignment of the parts without contact of the seals until the parts are substantially aligned.

It is, then, an object of this invention to provide a quick operating attachment device wherein a first part has circumferentially spaced and peripherally grooved fingers radiating therefrom and carrying a clamping ring for coaction with the fingers of a second part that project between the fingers of the first part and have outturned lugs for wedge engagement with the clamping ring.

A further object of the invention is to provide an attachment device of the clamping ring type wherein the ring is retained on one part in axial and circumferential position even when in its detached condition.

A still further object of the invention is to provide an improved draw bolt assembly for the clamping ring of an attachment device wherein contracting forces are evenly applied to the locking ring.

Another object of the invention is to provide a draw bolt assembly for the clamping ring of an attachment device which assembly will also positively expand the clamping ring to facilitate uncoupling of the parts.

Other and further objects of the invention will be apparent to those skilled in the art from the following detailed description of the annexed sheets of drawings which, by way of preferred examples only, illustrate two embodiments of the invention.

On the drawings:

Figure 1 is a peripheral plan view of the quick attachment device of this invention showing one form of draw bolt assembly for the clamping ring.

Figure 2 is a face view of the device of Figure 1 and illustrating parts in vertical cross section.

Figure 3 is a face view of the opposite side of the device of Figure 2.

Figure 4 is a cross-sectional view, taken substantially along the line IV—IV of Figure 2, and illustrating the device as mounted on an engine pad and carrying an accessory.

Figure 5 is a fragmentary vertical cross-sectional view of a modified form of clamping ring draw bolt assembly according to this invention.

Figure 6 is a fragmentary peripheral plan view of the device with the clamping ring removed.

As shown on the drawings:

The quick attachment device 10 of Figures 1 to 4 includes an engine mounting part 11, an accessory mounting part 12, a contractable split clamping ring 13, and a draw bolt assembly 14 for the clamping ring 13. The engine mounting part 11 is a flat ring with a plurality of bolt holes 15 therethrough receiving bolts 16 for attaching the part onto an engine mounting pad E as best shown in Figure 4. The bolts 16 preferably have flat heads 16a countersunk in or terminating flush with the outer flat face of the part 11.

The engine part 11 preferably has an axially extending pilot portion or lip 11a with a tapered outer periphery to fit within the engine pad E for quickly aligning the ring in proper position on the engine.

The inner periphery of the engine ring part 11 has a reduced diameter bore 11b within the lip 11a, a diverging bore 11c, and an enlarged bore 11d at the opposite face of the ring as best shown in Figure 4.

The part 12 is also in the form of a flat ring with bolt holes 17 therethrough adapted to receive bolts such as 18 for mounting the part onto an accessory A having a pilot flange A' fitted in a counterbore in the outer face of the part. If desired, the part 12 can be integral with the accessory A, thereby eliminating the use of mounting bolts 18, as best shown in Figure 4. The bolts 18 also have flat heads 18a terminating within or flush with the face of the part 12. The flat rings 11 and 12 can be relatively thin with the ring 11 nested in the adjoining face of the ring 12 so as to not appreciably add to the height of an engine accessory. Alternately, the rings can have deep flanges or sleeves to form a spline shaft chamber or the like therein.

A gasket G is interposed between each part 11 or 12 and its mounting E or A so that the bolts 16 and 18 will draw the parts into sealed relation with the engine and accessory respectively.

As best shown in Figure 4, the accessory ring part 12 has an upstanding cylindrical flange or inner rim 12a fitting within the ring 11. This flange 12a has a reduced diameter peripheral portion 12b on its outer end for mating with the bore 11b of the ring 11. A tapered periphery 12c connects the portion 12b with a larger diameter periphery 12d for mating with the portion 11d of the ring 11. A gasket or seal ring 19 is seated in a groove in the portion 12d of the flange 12a for sealing engagement with the wall 11d of the ring 11. The reduced diameter pilot end 12b is easily inserted into the larger diameter bore 11d of the engine ring part 11 and is guided by the tapering wall 11c into engagement with the smaller bore 11b so as to align the bores 11d and 12d prior to engagement of the seal ring 19 with the bore 11d. Two pilot bores are thereby provided on the rings for facilitating alignment of the rings during coupling operation.

The flat face of the ring 12 opposing the flat face of the ring 11 has a raised local annular contact band area 12e spaced outwardly from the flange 12 for the purpose of insuring a good bottoming of the ring 12 on the ring 11.

Each ring may be provided with one or more lubricant passages such as 20 and 21 respectively for alignment with each other as shown in Figure 4 and with registering passages in the engine and accessory parts. A gasket or seal 22 is provided in the contact face 12e of the ring 12 around the bore 21 thereof for engagement with the opposed face of the ring 11 to join the passages 20 and 21 in sealed relation.

The engine ring part 11 has circumferentially spaced fingers 23 projecting radially around the periphery thereof. These fingers 23 have peripheral grooves 24 therethrough. As best shown in Figure 4, the grooves 24 have wedge shaped tapering side walls. The clamping ring 13 fits within the grooves 24 of the fingers 23 and is retained therein against axial displacement.

The accessory ring part 12 has circumferentially spaced fingers 25 fitting between the fingers 23. Each finger 25 has an outturned lug 26 on the end thereof. The lugs 26 project radially outward to a diameter which is less than the diameter of the outer ends of the fingers 23. Therefore the lugs 26 terminate radially inward from the outer ends of the grooved fingers. Each lug 26 has opposed converging abutment faces providing a leading face for guiding the lug under the clamping ring 13 and a trailing face for forming an abutment surface aligned with an intermediate portion of the adjoining finger grooves 24. This abutment face, as best shown in Figure 4, is thus offset from the tapered side walls of the adjoining grooves 24 so that when the clamping ring 13 is tightened a wedging action will be exerted on the abutment face to create an axial load drawing the accessory ring part 12 tightly against the engine ring part 11.

To further facilitate alignment of the parts 11 and 12 as they are brought together, the engine ring part 11 has tapered peripheral shoulders 27 between the fingers 23 thereof for guiding the fingers 25 thereover into the spaces between the fingers 23. Likewise, the accessory ring part 12 has tapered shoulders 28 for guiding the fingers 23 of the ring part 11 thereover into the spaces between the fingers 25. These tapered shoulders 27 and 28 diverge outwardly to cylindrical flat circumferential walls in seating engagement with the inner faces of the respective fingers when the parts are coupled together as shown in Figure 4.

As best shown in Figure 6, the fingers 23 have tapered or beveled sides 23a at their leading ends which diverge to flat axially extending sides 23b. The fingers 25 have samilar beveled leading side edges 25a diverging to flats 25b. The flat side walls 23b and 25b are in close fitting relation to provide a torsional interlock of the parts 11 and 12 but the tapered narrower leading ends of the fingers afford easy assembly and serve to guide the fingers into their mated splined relationship.

The clamp assembly 14 for the ring 13 includes a pair of brackets 30 and 31 brazed or otherwise secured over the end portions of the ring 13. Each bracket has an upstanding hollow head 30a and 31a respectively. Each head has a tapered bore 32 diverging from the opposing faces of the heads to spherically concave recesses 33 in the outer faces thereof.

A draw bolt 34 has a shank 34a freely fitting through the tapered bores 32 and the recesses 33 of the heads 30a and 31a. A head 34b on the draw bolt 34 forms an end abutment for a washer 35 having a spherically convex face 35a swivelly seated in the recess 33 of the head 31a. The head 34b may be integral with the washer 35. A nut 36 threaded on the shank 34a of the draw bolt has a spherically convex end face 36a swivelly seated in the recess 33 of the head 30a. A projecting tongue 36b on the nut 36 seats in a groove 37 formed in the bracket 30 to form a retainer which holds the nut against rotation with the bolt without, however, carrying the clamping load.

The shank 34a is grooved to receive a first stop ring 38 between the heads 30a and 31a and a second stop ring 39 at the tip end of the shank. When the bolt 34 is rotated to thread the shank out of the nut 36, the tongue 36b of the nut is held by the groove 37 is the bracket 30 to prevent axial shifting of the nut and the stop ring 38 becomes effective to engage the head 31a for spreading the brackets 30 and 31 apart to thereby positively expand the locking ring 13. The stop ring 39 will abut the nut 36 to prevent the bolt from being removed from the assembly. Conversely, when the bolt is rotated to thread the shank thereof into the nut 36, the spherical faces 35a of the washer 35 and 36a of the nut 36 will respectively engage with their seats 33 of the heads 31a and 30a to draw the brackets together, thereby contacting the locking ring 13. The spherical seats and the tapered bores of the heads 30a and 31a afford relative swinging movements of the brackets on the draw bolt so that an efficient tangential pull will be exerted on the clamping ring.

A locking wire 40 passed through a hole in the head 34b of the bolt and through a hole in the bracket 31 will prevent unauthorized rotation of the bolt.

A rubber washer or retainer ring 41 is disposed around the shank 34a between the bracket heads 30a and 31a. This rubber washer is of sufficiently large diameter to project between the ends of the locking ring 13 into the space between a pair of adjoining fingers 23. When the locking ring 13 is loosely retained in the grooves 24 of the engine part 11, this rubber washer 41 will prevent rotation of the ring on the part, since it will abut the adjoining fingers 23. Since the washer 41 is resiliently deformable, it will not interfere with insertion of a finger 25 into the space between the fingers 23. The lug 26 on the finger 25 can easily deform and rotate the washer as the finger 25 is moved into coupling position.

The clamp or draw bolt assembly 14 is positioned in the most convenient location for accessibility of the bolt head 34b in each particular installation. The rubber washer 41 will then retain the assembly in the chosen circumferential position while the grooves in the fingers 23 will retain the assembly on the engine ring part in operative axial position. If it is desired to reverse the location of the draw bolt head 34b the stop ring 39 can be removed and the lock ring 13 expanded sufficiently to permit its removal and reversal.

A modified form of clamp or draw bolt assembly 14a is shown in Figure 5. In this assembly, a cable type locking ring 42 is utilized. The ends of the cable are anchored in metal ball members 43. Opposed brackets 44 and 45 each have ball recesses 46 in their outer ends for swivelly mounting the balls 43. Diverging tapered passages 47 receive the cable ends therethrough. The brackets have arcuate leg portions 48 which fit in the grooves of the fingers 23 and each bracket has an upstanding hollow head 44a and 45a equipped with a tapered bore and a spherical recess in the same manner as the heads 30a and 31a of the brackets 30 and 31 described above. The draw bolt assembly is the same as described above and has been marked with the same reference numerals. The nut 36, however, has a tail portion 36c which fits into an elongated groove 49 in the bracket 44. The clamp assembly 14a operates in the same general manner as the clamp assembly 14 but permits utilization of a cable type clamping ring of greater flexibility than the solid metal clamping ring 13.

From the above descriptions it will be understood that this invention now provides a quick acting device for attaching accessories on an engine through the media of a clamping ring. A draw bolt assembly for this clamping ring positively contracts and expands the ring for the coupling and uncoupling operation. The part of the device which is mounted on the engine has grooved fingers which retain the clamping ring in the desired axial position even when loose on the part. The draw bolt assembly is also equipped with a device for holding the clamping ring in desired circumferential position on the engine part, even when the ring is loose. The coupling parts are held together by the wedge action of the clamping ring on opposed interfitting fingers.

It will be understood that modifications and variations may be effected without departing from the scope of the novel concepts of the present invention.

I claim as my invention:

1. In a mounting device providing circumferentially spaced interfitting fingers and a clamping band therearound, the improvement which comprises a draw bolt assembly for the clamping band having a pair of brackets with opposed hollow heads on the ends of the clamping band, a draw bolt extending between said heads, means swivelly connecting the draw bolt and heads, a rubber washer on the draw bolt between said heads and adapted to project radially therefrom into a space between the fingers and holding the clamping band against circumferential displacement, and means on said draw bolt co-acting with said heads for positively contracting or expanding the clamping band.

2. In a quick attachment device of the type having mounting part means providing circumferentially spaced peripherally grooved fingers therearound, the improvement of a split clamping band surrounding said fingers and adapted to be mounted in the grooves thereof, brackets on the ends of the clamping band having spherically recessed hollow heads, a draw bolt extending through said heads, a washer with an arcuate surface seated in the recess of one head, a nut threaded on said draw bolt having an arcuate surface seated in the recess of the other head, means attaching said nut to the adjoining bracket to hold the nut against axial shifting on said bracket, means on said draw bolt between said heads for coacting with the nut to separate the heads and thereby expand the clamping ring, and a rubber washer on said draw bolt between said heads adapted to project radially therefrom into the space between a pair of the adjoining grooved fingers for holding the clamping ring against circumferential displacement.

3. In a mounting device providing circumferentially spaced peripherally grooved fingers therearound, the improvement of a split clamping ring surrounding said fingers and seated in the grooves thereof, brackets swivelly mounted on the ends of the clamping ring, a draw bolt and nut assembly connecting said brackets, and a rubber washer on the draw bolt between the brackets projecting into the space between two adjoining fingers for holding the clamping ring against circumferential displacement on said part.

4. In a quick detach accessory mount, base and accessory parts comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the base and accessory parts together axially when the clamping ring is tightened radially.

5. In a quick detach accessory mount, base and accessory parts comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the base and accessory parts together axially when the clamping ring is tightened radially, one of said ring members having axially outwardly tapered peripheral shoulders between the fingers thereof for guiding the fingers on the other of said ring members thereover into the spaces between the fingers on said one of said ring members.

6. In a quick detach accessory mount, base and accessory parts comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the base and accessory parts together axially when the clamping ring is tightened radially, both of said ring members having axially extending tapered shoulders between the respective mating fingers for guiding the corresponding respective mating fingers into interfitting relationship with one another.

7. In a quick detach accessory mount, base and accessory parts comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the base and accessory parts together axially when the clamping ring is tightened radially, both of said ring members having axially extending tapered shoulders between the respective fingers thereof for guiding the corresponding respective mating fingers into interfitting relationship with one another, said tapered shoulders diverging outwardly to cylindrical flat circumferential walls in seating engagement with the inner faces of the respective fingers when the engine and accessory parts are coupled together.

8. In a quick detach accessory mount, base and accessory parts comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each of said lugs having opposed converging abutment surfaces providing a leading face for guiding the lug axially under the clamping ring and a trailing face aligned with an intermediate portion of the adjoining laterally grooved fingers on said first ring member and cooperating with said clamping ring to draw the base and accessory parts together axially when the clamping ring is tightened radially, a draw bolt assembly on said clamping ring, and a resiliently deflectable member on the bolt assembly extending into the space between two adjoining groved fingers in overlying relation to the finger of the second ring member lying in said space for holding the clamping ring against circumferential displacement on said first ring member.

9. In a quick detach accessory mount, engine and accessory parts, comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls and retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each lug having opposed converging abutment surfaces providing a leading face for guiding the lug axially under the clamping ring and a trailing face aligned with an intermediate portion of the adjoining laterally grooved fingers on said first ring member and cooperating with said clamping ring to draw the engine and acceessory parts together when the clamping ring is radially tightened, said first ring member having a multi-diameter bore extending therethrough with a large bore at the outer face thereof, a smaller bore at the opposite side thereof, and a tapered bore connecting the large and smaller bores, said second ring member having a cylindrical rim fitting within the first ring member and an outturned face for overlying the first ring member, said rim having a small diameter outer end sized for fitting the smaller bore of the first ring member and a larger diameter inner end for fitting the larger bore of the first ring member, and a seal between the larger bore of the first ring member and the mating larger diameter portion of the second ring member.

10. In a quick detach accessory mount, engine and accessory parts, comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls and retained in said lateral grooves of said finger against axial displacement, said second ring member having an annular row of circumferentially spaced fingers fitting between said fingers on said first ring member and including lugs projecting radially outwardly from said fingers to a diameter less than the outer diameter of the fingers on said first ring member, each lug having opposed converging abutment surfaces providing a leading face for guiding the lug axially under the clamping ring and a trailing face aligned with an intermediate portion of the adjoining laterally grooved fingers on said first ring member and cooperating with said clamping ring to draw the engine and accessory parts together when the clamping ring is radially tightened, said first ring member having a multi-diameter bore therethrough, said second ring member having a multi-diameter cylindrical flange received in the first ring member with a smaller diameter portion thereof being guided into the corresponding smaller diameter portion of the bore through the larger end of the bore, and a seal ring carried by the cylindrical flange of the larger diameter portion thereof and adapted to engage the larger diameter portion of said bore only after the smaller diameter portion of said bore has guided the second ring member into substantial alignment with the first ring member.

11. In a quick detach accessory mount, engine and accessory parts, comprising first and second ring members, respectively, said first ring member having an annular row of circumferentially spaced radially outwardly projecting peripheral fingers, each finger having a lateral groove formed therein to provide wedge shaped tapering side walls converging radially inwardly, a clamping ring having complementary wedge shaped tapering side walls and retained in said lateral grooves of said fingers against axial displacement, said second ring member having an annular row of circumferentially spaced fingers fitting between said fingers on said first ring member and including lugs projecting radially outwardly from said fingers to a diameter less than the outer diameter of the fingers on said first ring member, each lug having opposed converging abutment surfaces providing a leading face for guiding the lug axially under the clamping ring and a trailing face aligned with an intermediate portion of the adjoining laterally grooved fingers on said first ring member and cooperating with said clamping ring to draw the engine and accessory parts together when the clamping ring is radially tightened, said first ring member having a bore formed therein with a large diameter outer end and a smaller diameter inner end connected by an inclined wall, said second ring member having a multiple diameter flange with a small diameter leading end adapted to fit the inner end of said bore and a large diameter trailing end adapted to fit the large diameter of said bore, and a sealing ring carried by the large diameter end of said flange for sealing engagement with the large diameter end of said bore, said small diameter leading end of said flange being guided by said inclined wall into seating engagement with the smaller diameter inner end of said bore before the sealing ring engages the large diameter portion of said bore.

References Cited in the file of this patent
UNITED STATES PATENTS

| Number | Name | Date |
|---|---|---|
| 1,277,398 | Elliott | Sept. 3, 1918 |
| 1,457,155 | Fey | May 29, 1923 |
| 1,882,616 | Hutchinson | Oct. 11, 1932 |
| 2,341,828 | Tetzlaff | Feb. 15, 1944 |
| 2,345,269 | Lackey | Mar. 28, 1944 |
| 2,409,128 | Krasberg | Oct. 8, 1946 |
| 2,439,161 | Du Bois | Apr. 6, 1948 |
| 2,523,928 | Szekely | Sept. 26, 1950 |
| 2,553,220 | Troeger | May 15, 1951 |

FOREIGN PATENTS

| Number | Country | Date |
|---|---|---|
| 931,202 | France | Sept. 29, 1947 |